Feb. 19, 1963 B. E. OSTBERG 3,078,178
METHOD OF HYDROLIZING AND POLISHING SURFACE OF
CELLULOSE ESTER SUBSTRATE AND PHOTOGRAPHIC
PRODUCT PRODUCED THEREFROM
Filed March 2, 1960
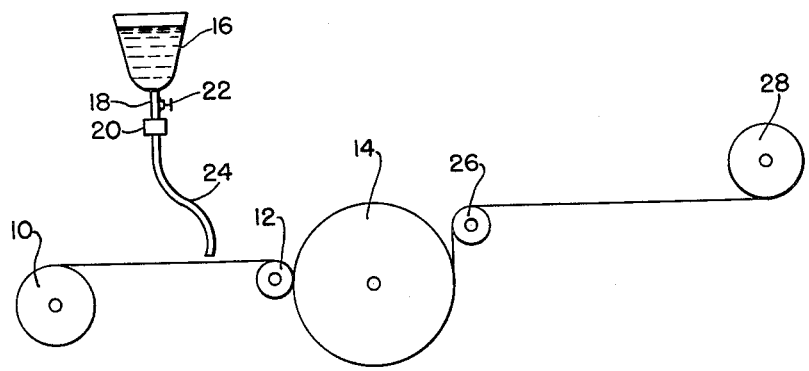
INVENTOR.
Bertil E. Ostberg
BY
ATTORNEYS United States Patent Office 3,078,178
Patented Feb. 19, 1963

3,078,178
METHOD OF HYDROLIZING AND POLISHING SURFACE OF CELLULOSE ESTER SUBSTRATE AND PHOTOGRAPHIC PRODUCT PRODUCED THEREFROM
Bertil E. Ostberg, Melrose, Mass., assignor to Polaroid Corporation, Cambridge, Mass., a corporation of Delaware
Filed Mar. 2, 1960, Ser. No. 12,304
22 Claims. (Cl. 117—34)

This invention relates to a new and improved method for treating polymeric plastic films such as cellulose esters of organic acids to be used, for example, in connection with photographic products and processes.

It has long been recognized that certain linear polymeric plastic materials, such, for example, as cellulose acetate, are useful in connection with the making of photographic prints. For instance, in the well known diffusion-transfer processes, polymeric plastic materials, such as cellulose acetate, have been utilized for carrying positive photographic images. In the case of prints to be viewed by reflection, cellulose acetate, for example, is usually coated or carried upon a suitable paper stock such as baryta paper. Cellulose acetate, in turn, is a base layer for subsequent layers upon which silver may be deposited to form a positive photographic image or print. The product and use of such photographic elements is disclosed, for example, in U.S. Patent No. 2,543,181, issued to Edwin H. Land on February 27, 1951.

In connection with such image-receiving elements, it is often desirable to impart a uniform high gloss to the surface of the cellulose ester. To obtain these properties, it is customary to deposit a coating of a cellulose ester, for example, cellulose acetate, upon one surface of a paper stock and then to polish the exposed surface of the coating. The polishing is commonly done by bringing the coated stock into contact with a smooth, hard surface such as, for example, a chrome-plated drum. Conventionally, there are limits to the speed and ease of polishing such surfaces. For example, if a conventional procedure is followed whereby a thin coating of a cellulose acetate is applied to the base paper and, after some solvents have been removed, the coating is polished for improved smoothness and gloss, satisfactory polishing will be obtained only if the partly dry coating comes in contact for a relatively long period with a heated, polished chrome drum. This requirement for extended contact necessarily reduces the rate at which coated stock may be polished.

Cellulose esters of organic acids, particularly cellulose acetate, also have been suggested for use as a negative or photosensitive element base or support. However, heretofore such base materials have not been found to be entirely satisfactory for use in diffusion-transfer processes due to the lack of good adhesion of silver halide emulsions thereto. When a silver halide emulsion is carried directly upon a cellulose ester layer or base, the poor adhesion therebetween frequently gives rise to undesirable and unwanted separation.

In copending application Serial No. 669,064, filed July 1, 1957, now abandoned, there is disclosed a method for rapidly and easily polishing a surface of an organic plastic film or coating without modifying the composition of the surface. The present invention is directed to an improved method whereby a uniform high gloss can be rapidly and easily imparted to a surface of a cellulose ester useful as a base for photographic images and whereby the surface characteristics of a cellulose ester are modified so as to result in a surface to which silver halide emusions will firmly adhere.

Accordingly, the objects of the present invention are to provide a method for improving the gloss and uniformity of cellulose ester sheets and coatings; to permit production of high gloss coated stock at high speeds; and to provide a uniform high-gloss base layer for receiving photographic images printed by means of a diffusion-transfer process.

Other objects of the present invention are to provide a method for modifying the surface characteristics of cellulose ester sheets and coatings and to provide a surface to which silver halide emulsions will adhere strongly.

Still another object of the present invention is to provide photographic products useful in diffusion-transfer photographic processes.

Other objects of the invention will in part be obvious and will in part appear hereinafter.

The invention accordingly comprises the method involving the several steps and the relation and order of one or more of such steps with respect to each of the others and the products possessing the features, properties and relation of elements which are exemplified in the following detailed disclosure and the scope of the application of which may be indicated in the claims.

For a fuller understanding of the nature and objects of the invention reference should be had to the following detailed description taken in connection with the accompanying drawing which is a schematic representation of one apparatus for practicing the invention showing also the arrangement of steps in the preferred method.

A preferred embodiment of the improved method herein described comprises applying to the surface of a substantially solvent-free, hardened cellulose ester, such as cellulose acetate, a predetermined quantity of a liquid which has the properties in the quantity and duration of application of both softening but not completely dissolving the cellulose ester and of hydrolyzing the cellulose ester. The liquid is preferably so selected that in the amount applied and for the interval during which it is in contact with the surface to be treated only a skin portion of the cellulose ester sheet or coating is softened and hydrolyzed. The surface softening and hydrolyzing liquid preferably comprises a mixture of a material capable of hydrolyzing the cellulose ester to cellulose, e.g., an alkaline metal hydroxide, and a material capable of softening the cellulose ester, e.g., water. For example, a suitable mixture may comprise a hydrolyzing agent such as sodium hydroxide and a surface-softening agent such as water and/or an alcohol or a ketone.

Referring now to the schematic representation in the drawing, there is shown a supply roll 10 upon which dried stock has been wound, spatially separated from the tension and nip roller 12. Nip roller 12 is preferably provided with a non-metallic slightly yieldable surface and may be so disposed as to press the stock against a polishing drum 14. Above the stock is positioned a reservoir 16 which is of any suitable configuration to hold a desired amount of the surface softening-hydrolyzing liquid. The base of reservoir 16 is provided with an opening 18 leading to a manifold 20. A suitable feed control valve 22 may be provided in the line to manifold 20 or at any other point in the feed assembly. Manifold 20 may have a series of exit apertures, each connecting with a feed tube 24 which may lead to the stock at a point just prior to nip roller 12 as shown or to the nip or space between nip roller 12 and polishing drum 14.

Contacting nip roller 12 is a large polishing drum 14. Drum 14 preferably has a cylindrical polished chrome-plated surface which is as free as possible from scratches, projections or other irregularities. Drum 14 may have provision for heating the polished surface from within by means, for example, of an annular jacket and suitable supply and return passage for passing hot water through the jacket. Provision may be made for varying the pressure of nip roller 12 against the drum 14. Directly adjacent to drum 14 is positioned tension roller 26, which is in turn spaced a suitable distance from an end storage reel 28.

One preferred embodiment of the present method may be performed in the following manner: Paper stock such as baryta paper is coated by any suitable means with a thin layer of cellulose acetate which may be applied in the form of a solution made up of cellulose acetate flake dissolved in suitable solvents. For example, a suitable solution may comprise 25 g. of cellulose acetate, 180 cc. ethyl acetate and 60 cc. methanol. The coated stock is then dried to remove as much of the solvents as feasible, preferably until less than the order of 5% of the original solvent remains. Preferably, the stock should be dry enough to be rollable without blocking. The coated stock may then be wound on a suitable core which may then be positioned as supply reel 10. From reel 10 the coated and dried stock preferably passes around nip roller 12 and is pressed into contact with drum 14. A minute quantity of a liquid is applied to the coated surface just before or as it comes into contact with drum 14. This liquid, supplied from reservoir 16 through manifold 20 and feed tubes 24, may comprise for example, a water-methanol solution of sodium hydroxide. One suitable liquid composition may comprise 50 g. methanol, 50 g. water and 20 g. sodium hydroxide. This solution or mixture may preferably be regulated so that two to three drops per second are applied from each feed tube 24.

The coated stock is then maintained in contact with the polishing drum 14 for a time on the order of about one second. The drum surface may preferably be at a temperature of about 180° F., although other temperatures between about 120° F. and 220° F. do not lead to significantly different results. The pressure of the stock against the drum 14 is not critical, so long as at least a minimal pressure is maintained; a good polish will result at pressures ranging from 10 to 250 pounds per linear inch of stock width, or at even higher pressures.

The stock is stripped from drum 14 by means of tension roller 26 and may then be wound around storage reel 28 for further processing. The stock after removal from the drum may be thoroughly washed and dried before being rewound on storage reel 28.

Tests have indicated that cellulose acetate coated in a thin layer upon baryta paper and treated on the apparatus and in accordance with the method described above may have a thin or skin portion of the surface thereof hydrolyzed and polished to a high, uniform gloss at very high speeds. Moreover, it has been found that the hydrolyzed and polished surface of a cellulose acetate sheet or coating on paper stock could be used without further coatings to accept and strongly hold a layer of processing composition in which a silver image is produced by diffusion-transfer techniques. Also, such deacetylated or converted surfaces have been found to be useful as negative emulsion bases since the flat surfaces give better resolution negatives and since the converted surfaces provide for the necessary adhesion of the silver halide emulsion thereto. It has been found that a silver halide emulsion such as a silver halide gelatin emulsion adheres much more firmly to a converted surface comprising cellulose than to a cellulose acetate surface.

Several alternative arrangements and procedures are possible without departing from the scope of the invention. For example, it is to be understood that the method described above may be incorporated with other earlier and later processes in an assembly line technique by eliminating reels 10 and 28 and instead feeding the stock continuously from or to other equipment.

The apparatus may also be varied by replacing reservoir 16 and its associated feeding system with suitable devices for spraying or otherwise depositing the surface softening-hydrolyzing mix upon the cellulose acetate coating.

Polishing drum 14 may have any suitable internal heating arrangement or may be heated externally. As has been previously indicated, the drum surface temperature may be varied widely. Preferably, the temperature need only be high enough to assist in softening the surface to be polished, to accelerate the hydrolysis and to substantially redry the softened surface before it is separated from the drum surface. The upper temperature limit is similarly flexible; the drum temperature should not be so high as to cause the liquid to boil away before it has performed its funtcions, nor should the temperature be high enough to cause the plastic surface to become overly tacky or to develop other unfavorable properties. The drum surface may be chromium or a chrome alloy, stainless steel, glass, or any other material that will impart the desired surface characteristics to the stock. Although it has been found convenient to use a polishing drum having a diameter between 3 and 6 feet, larger or smaller drums may be used.

A wide variety of materials may be used in the method. For example, other papers or cloths may be used as the base material instead of baryta paper, or one or both surfaces of a preformed, self-supporting cellulose ester film or sheet may be polished in this manner. Among the cellulose esters of organic acids which may be hydrolyzed and polished by a suitable selection of softening agents, hydrolyzing agents and heating conditions mention may be made of cellulose esters of fatty acids such as cellulose acetate, cellulose propionate, cellulose butyrate, cellulose acetate butyrate, cellulose acetate propionate and the like. As can be seen both esters of single fatty acids and mixed esters may be hydrolyzed and polished by employing the present method.

Similarly, a great number of surface-softening agents or materials may be used. Although water, for example, may be employed as a softener for cellulose acetate, it is often desirable to employ a liquid which softens at a more rapid rate, such, for example, as an alcohol-water mixture or a ketone-water mixture. Alcohols such as methanol, ethanol, butanol and the like may also be employed alone when cellulose acetate is to be treated. However, as indicated, mixtures of water and other compounds, such as ethanol-water, propanol-water or an acetone-water mixture are more effective particularly where very high processing speeds are desired. Obviously, the choice of any surface-softening materials or mixture will depend upon the particular cellulose ester to be treated. In general, it is desirable to use materials or mixtures in which the cellulose ester to be hydrolyzed and polished is only slightly soluble, i.e., those materials which may be classed as swelling agents for the cellulose ester within the period of application of the material to the surface. The term "swelling agent" as used herein shall be understood to include solvents as well as substances which swell or soften the cellulose ester to which they are applied without actually dissolving it.

Likewise, a great number of hydrolyzing agents for cellulose esters may be used in conjuntcion with the surface-softening agents. For example, hydroxides such as ammonium hydroxide, alkali metal hydroxides, such as sodium and potassium hydroxides, amines, quaternary bases, e.g., quaternary ammonium bases such as choline, tetramethyl ammonium hydroxide, and the like, may be utilized. Other well known hydrolyzing agents for cellulose esters may also be employed.

The relative concentrations or amounts of softening material and hydrolyzing agent in a mixture applied to the surface of the cellulose ester to be treated may be varied considerably and may be readily determined in any particular instance. Suitable solutions may comprise, for example, aqueous solutions of sodium hydroxide, e.g., 10 percent, or aqueous solutions of sodium hydroxide mixed with, say, methanol, to form solutions wherein methanol constitutes a major percentage by weight, e.g., 60 to 80 percent, and the like. Obviously the composition of the desired solution may be varied considerably. However, the concentrations of softening material and hydrolyzing agent in the mixture are preferably so selected that in the amount applied and for the interval during which it is in contact with the cellulose ester surface to be treated, only a skin portion of the cellulose ester sheet or coating is softened and hydrolyzed essentially to cellulose.

Although the prime object of the present invention is to provide an optically smooth, high-gloss surface, it is obvious that other surface characteristics may be imparted by substituting, for the smooth polishing drum of the preferred embodiment, a surface having other characteristics such as, for example, lenticules or a pebble wrinkle or sand finish. The terms "polishing element" and "polishing surface" as used herein shall be understood as including not only smooth-surfaced elements but also those having other surface characteristics.

Since certain changes may be made in the above method and products without departing from the scope of the invention herein involved, it is intended that all matter contained in the above description or shown in the accompanying drawing shall be interpreted as illustrative and not in a limiting sense.

What is claimed is:

1. The method of polishing a cellulose ester surface which comprises the steps of applying to said cellulose ester surface a quantity of a liquid comprising a softening agent and a hydrolyzing agent for said cellulose ester so as to soften and hydrolyze but a thin surface portion of said cellulose ester, immediately thereafter contacting the softened surface with a heated polishing surface, and maintaining said softened surface against the heated polishing surface for a relatively short period of time to polish and harden the resultant thin surface.

2. The method of producing a smooth, hard, high-gloss surface which comprises the steps of applying to a cellulose ester layer upon a paper support a quantity of a liquid comprising a softening agent and a hydrolyzing agent for said cellulose ester so as to soften and hydrolyze but a thin surface portion of said layer, immediately thereafter contacting the softened surface with a heated smooth-surfaced polishing element, and maintaining said softened surface against the heated polishing element surface for a relatively short period of time to form a smooth, hard, high-gloss layer surface.

3. The method of claim 2 wherein said support comprises baryta paper.

4. The method of claim 2 wherein said cellulose ester comprises cellulose acetate.

5. The method of claim 2 wherein said softening agent comprises water and an alcohol.

6. The method of claim 5 wherein said alcohol is methanol.

7. The method of claim 2 wherein said softening agent comprises water and a ketone.

8. The method of claim 2 wherein said hydrolyzing agent comprises a hydroxide.

9. The method of claim 8 wherein said hydroxide comprises an alkali metal hydroxide.

10. The method of claim 9 wherein said alkali metal hydroxide comprises sodium hydroxide.

11. The method of producing a smooth, hard, high-gloss surface which comprises the steps of applying to at least one surface of a cellulose ester film a quantity of a liquid comprising a softening agent and a hydrolyzing agent for said cellulose ester so as to soften and hydrolyze but a thin surface portion of said film, immediately thereafter contacting the softened surface with a heated, smooth-surfaced polishing element, and maintaining said softened surface against the heated polishing element for a relatively short period of time to form a smooth, hard, high-gloss film surface.

12. The method of producing a smooth, hard, high-gloss surface for carrying a photographic image which comprises the steps of applying to a cellulose acetate surface a quantity of a liquid comprising a softening agent and a hydrolyzing agent for said cellulose acetate so as to soften and hydrolyze but a thin surface portion of said cellulose acetate, immediately thereafter contacting the softened surface with a smooth-surfaced polishing element, and maintaining said softened surface against the heated polishing element surface for a relatively short period of time to polish and harden the resultant thin surface.

13. The method of claim 12 wherein said softening agent comprises water and an alcohol and said hydrolyzing agent comprises a hydroxide.

14. The method of claim 13 wherein said alcohol is methanol and said hydroxide is sodium hydroxide.

15. A photographic product useful for carrying photographic images comprising a cellulose ester base having a thin, smooth, hard, high-gloss surface portion produced by applying to the surface of said cellulose ester base a quantity of a liquid comprising a softening agent and a hydrolyzing agent for said cellulose ester so as to soften and hydrolyze but a thin surface portion of said cellulose ester base, and immediately thereafter contacting said softened surface with a heated smooth-surfaced polishing element for a relatively short period of time to polish and harden the resultant thin surface.

16. A photographic product useful for carrying photographic images comprising a paper support, and a cellulose ester layer having a thin, smooth, hard, high-gloss surface portion carried by one side of said support, said surface portion being produced by applying to said cellulose ester layer upon said paper support a quantity of a liquid comprising a softening agent and a hydrolyzing agent for said cellulose ester so as to soften and hydrolyze but a thin surface portion of said layer, and immediately thereafter contacting said softened surface with a heated, smooth-surfaced polishing element for a relatively short period of time to polish and harden the resultant thin surface.

17. The photographic product of claim 16 wherein said paper support comprises baryta paper and said cellulose ester comprises cellulose acetate.

18. A photographic product comprising a paper support, a cellulose ester layer having a thin, smooth, hard, high-gloss surface portion carried by one side of said support and a silver halide emulsion layer carried by said surface portion of said cellulose ester layer, said surface portion being produced by applying to said cellulose ester layer upon said paper support a quantity of a liquid comprising a softening agent and a hydrolyzing agent for said cellulose ester so as to soften and hydrolyze but a thin surface portion of said layer, and immediately thereafter contacting said softened surface with a heated, smooth-surfaced polishing element for a relatively short period of time to polish and harden the resultant thin surface.

19. The photographic product of claim 18 wherein said cellulose ester comprises cellulose acetate and said emulsion layer comprises a silver halide gelatin emulsion layer.

20. The method of polishing a surface of a cellulose ester film which comprises the steps of providing at least one source of a liquid comprising a softening agent and a hydrolyzing agent for said cellulose ester, moving said cellulose ester film past said source of liquid, contacting said cellulose ester film during movement past said source with a quantity of liquid sufficient to soften and hydrolyze only a thin surface portion of said cellulose ester film, substantially immediately after passing said source pressing the softened surface into contact with a rotating, smooth-surfaced, polishing element, said polishing element being treated to a temperature sufficient to substantially redry said softened surface, and maintaining said softened surface in contact with said heated, rotating, polishing element until a smooth, hard, high-gloss surface is formed.

21. The method of polishing a cellulose ester surface which comprises the steps of applying to said cellulose ester surface a quantity of a hydrolyzing solution for said cellulose ester so as to hydrolyze but a thin surface portion of said cellulose ester, said hydrolyzing solution also comprising a softening agent for said cellulose ester, immediately thereafter contacting the hydrolyzed surface with a heated polishing surface, and maintaining said hydrolyzed surface against the heated polishing surface for a relatively short period of time to polish and harden the resultant thin surface.

22. The method of claim 21 wherein said hydrolyzing solution comprises an aqueous solution of a hydrolyzing agent.

References Cited in the file of this patent

UNITED STATES PATENTS

| | | |
|---|---|---|
| 1,074,092 | Mork | Sept. 23, 1913 |
| 1,719,166 | Bradner | July 2, 1929 |
| 1,988,550 | Gladhorn et al. | Jan. 22, 1935 |
| 1,997,745 | Renker | Apr. 16, 1935 |
| 2,027,688 | Hagedorn | Jan. 14, 1936 |
| 2,096,973 | Munch | Oct. 26, 1937 |
| 2,169,200 | Uhler | Aug. 8, 1939 |
| 2,216,735 | Carothers | Oct. 8, 1940 |
| 2,366,723 | Galley | Jan. 9, 1945 |
| 2,404,422 | Andersen | July 23, 1946 |
| 2,704,262 | Alink et al. | Mar. 15, 1955 |
| 2,716,077 | Adam et al. | Aug. 23, 1955 |
| 2,758,943 | Alink et al. | Aug. 14, 1956 |